US008194278B2

(12) United States Patent
Han

(10) Patent No.: US 8,194,278 B2
(45) Date of Patent: Jun. 5, 2012

(54) IMAGE FORMING APPARATUS TO SELECT ALTERNATE IMAGE INFORMATION AND CONTROL METHOD THEREOF

(75) Inventor: Mi Kyoung Han, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1017 days.

(21) Appl. No.: 11/956,545

(22) Filed: Dec. 14, 2007

(65) Prior Publication Data

US 2008/0144061 A1 Jun. 19, 2008

(30) Foreign Application Priority Data

Dec. 15, 2006 (KR) ........................ 10-2006-0128367
Nov. 21, 2007 (KR) ........................ 10-2007-0119224

(51) Int. Cl.
*G06K 15/00* (2006.01)

(52) U.S. Cl. ........................ 358/1.18; 382/135; 399/366

(58) Field of Classification Search ................... 358/1.1, 358/1.16, 1.18; 382/135, 137; 399/366
See application file for complete search history.

(56) References Cited

U.S. PATENT DOCUMENTS

2002/0196465 A1 * 12/2002 Ohta ........................... 358/1.16

FOREIGN PATENT DOCUMENTS

JP 2000-227741 8/2000

* cited by examiner

*Primary Examiner* — Thomas D Lee
(74) *Attorney, Agent, or Firm* — Staas & Halsey LLP

(57) ABSTRACT

An image forming apparatus and a control method thereof that outputs an image of currency wherein a portion of the image of the currency is replaced with another image such that the counterfeiting of currency is prevented, the method including: determining whether a printing object is currency; selecting an alternate image corresponding to identification information of the currency if the printing object is the currency; and printing the selected alternate image information.

33 Claims, 4 Drawing Sheets

| country | | amount | | alternate image information |
|---|---|---|---|---|
| 1 | Korea | 1 | 1,000 won | 1,000 won |
| 1 | Korea | 2 | 5,000 won |  |
| 1 | Korea | 3 | 10,000 won |  |
| 2 | USA | 1 | 1 dollar |  |
| 2 | USA | 2 | 10 dollar |  |
| 2 | USA | 3 | 20 dollar | 20 dollar |
| 2 | USA | 4 | 50 dollar |  |
| 2 | USA | 5 | 100 dollar |  |
| ⋮ | ⋮ | ⋮ | ⋮ | ⋮ |

| country | | amount | | alternate image information |
|---|---|---|---|---|
| – | – | – | – |  |
| – | – | – | – |  |
| – | – | – | – |  |
| ⋮ | ⋮ | ⋮ | ⋮ | ⋮ |

IMAGE FORMING APPARATUS TO SELECT ALTERNATE IMAGE INFORMATION AND CONTROL METHOD THEREOF

CROSS-REFERENCE TO RELATED APPLICATIONS

This application claims the benefit of Korean Application Nos. 2006-128367, filed Dec. 15, 2006 and 2007-119224 filed Nov. 21, 2007 in the Korean Intellectual Property Office, the disclosures of which are incorporated herein by reference.

BACKGROUND OF THE INVENTION

1. Field of the Invention

Aspects of the present invention relate generally to an image forming apparatus, and more particularly, to an image forming apparatus and a control method thereof, wherein an alternate image is output when a printing object is currency so that counterfeiting of currency can be prevented.

2. Description of the Related Art

As the performance of image forming apparatuses (such as computer scanners, color printers, laser beam copiers, digital cameras, and the like) has improved, image resolution has also considerably improved. Accordingly, there has been a gradually increasing incidence of currency bills and securities counterfeiting through the use of image forming apparatuses. Therefore, counterfeiting crimes have been spotlighted as a serious social problem.

Since paper currency, bills, checks, gift certificates, and securities, which are currently used, have been produced by applying various counterfeiting countermeasures, the use of counterfeit bills and checks has been controlled. In particular, a method has been used in which a sensor capable of discriminating currency is installed in an image forming apparatus (such as a computer scanner or a color copier), and the currency cannot be scanned and copied by any means if the currency is detected by the sensor.

Further, the use of counterfeit bills and checks has been controlled by using a method of outputting an image of currency such that a portion of the image of the currency is omitted or the serial number of the currency cannot be seen with naked eyes. However, although the aforementioned methods can prevent the currency from being scanned or copied, there is no solution for the image forming apparatus to deal with the currency.

Furthermore, according to the aforementioned methods, since an image of currency is simply omitted or modified, the whole image of the currency is restricted from being output. Therefore, there is a problem in that various desires of users cannot be satisfied.

SUMMARY OF THE INVENTION

Aspects of the present invention provide an image forming apparatus and a control method thereof, wherein the structure of the image forming apparatus is improved such that the counterfeiting of currency can be prevented and an image of currency can be output while being replaced with another image.

According to an aspect of the present invention, there is provided a method of controlling an image forming apparatus, the method including: determining whether a printing object to be printed by the image forming apparatus is currency; selecting alternate image information corresponding to identification information of the currency if the printing object is the currency; and printing the selected alternate image information.

The currency may include any one of a paper currency, a bill, a check, a gift certificate, and a security.

The identification information of currency may include any one of a country, an amount of currency, and a serial number of the currency.

The method may further include storing a plurality of currency identification information and alternate image information corresponding to the currency identification information.

The alternate image information may include a plurality of predetermined alternate image information that does not correspond to the identification information of currency.

If the currency identification information has been stored, the alternate image information corresponding to the currency identification information may be selected from the stored currency identification information.

If the currency identification information is not stored, the predetermined alternate image information may be selected.

The stored alternate image information may be updated.

According to another aspect of the present invention, there is provided an image forming apparatus including: a storage unit to store a plurality of currency identification information and alternate image information corresponding to the currency identification information; a reader unit to determine whether a printing object is currency; a controller to determine whether the currency identification information is stored in the storage unit when the printing object is currency, and to select the alternate image information corresponding to the currency identification information when the currency identification information is stored in the storage unit; and a printing unit to print the selected alternate image information.

The storage unit may store a plurality of predetermined alternate image information that do not correspond to any currency identification information.

The controller may select the predetermined alternate image information from the storage unit when the currency identification information is not stored in the storage unit.

The image forming apparatus may update the alternate image information stored in the storage unit.

According to yet another aspect of the present invention, there is provided a counterfeiting prevention system including: a currency reader to determine whether a print object to be printed is currency; a central server to store alternate image information; and an image forming apparatus to print the alternate image information when the print object is the currency.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
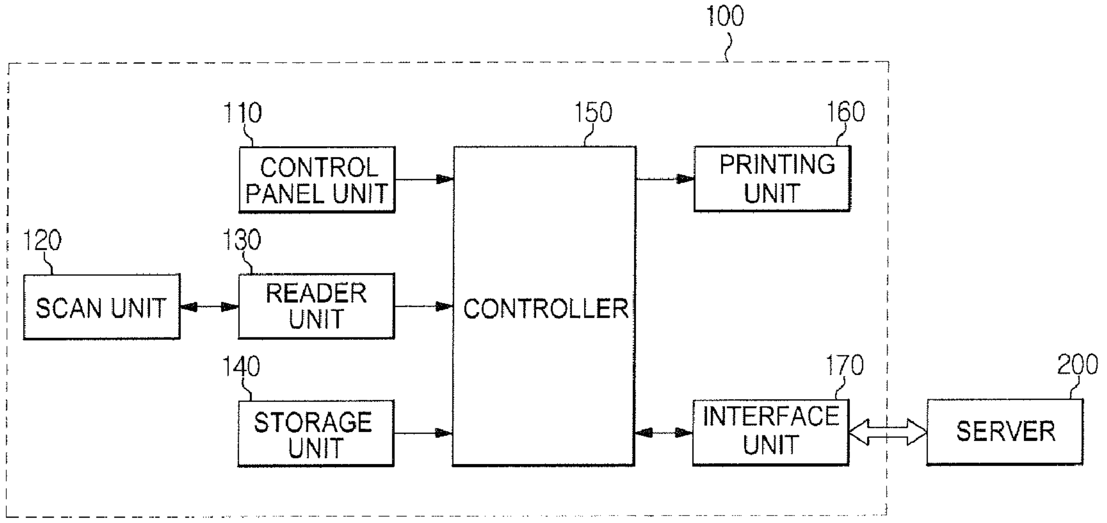
FIG. 1 is a block diagram illustrating a configuration of an image forming apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating a configuration of an image forming apparatus 100 according to an embodiment of the present invention. The image forming apparatus 100 includes a control panel unit 110, a scan unit 120, a reader unit 130, a storage unit 140, a controller 150, a printing unit 160 and an interface unit 170. The image forming apparatus 100 according to aspects of the present invention is connected to a server 200 through the interface unit 170.

The control panel unit 110 includes a control panel and an LCD panel. A user command (or input) is transferred to the controller 150 through the control panel. Furthermore, the status of the image forming apparatus 100 is displayed on the LCD panel according to a control signal from the controller 150. The scan unit 120 scans an image of an object to be printed (for example, a document or currency). The reader unit 130 reads the image pattern of the scanned printing object to determine whether the printing object is paper currency, a bill, a check, a gift certificate, a security, or similar forms of currency. The storage unit 140 stores identification information of currency and information of an alternate image to be output in place of the currency. The storage unit 140 may be a storage medium such as DRAM, SDRAM, RDRAM, DDRAM, or SRAM. However, aspects of the present invention are not limited thereto. For example, the storage unit 140 may also be a hard disk drive (HDD).

The identification information may include at least one of a country, an amount, and a serial number information of the currency. For example, the identification information may include at least one of identification information corresponding to the country (such as Korea, U.S.A., or Japan), identification information in accordance with a kind of amount (such as 1000 won, 5000 won, or 10000 won), and/or a serial number of the currency (such as BA1240000). Furthermore, the alternate image information may be output in various forms as image information to be output in place of the currency. For example, the alternate image information may include various images, such as information on an amount of the currency, picture information of the image forming apparatus, information on regulations related to currency counterfeiting, the national flag of the corresponding currency, alignment page information, self-test information, and/or nozzle pattern image information.

Furthermore, according to aspects of the present invention, the alternate image information may include various images configured for each country/amount/serial number, thereby satisfying various desires of users.

Meanwhile, the storage unit 140 may store the alternate image information by dividing the alternate mage information into a plurality of alternate image information that corresponds to the identification information and a plurality of alternate image information that does not correspond to the identification information.

Figure 2:
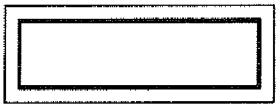
FIG. 2 is a view illustrating alternate image information that corresponds to currency identification information related to countries and amounts of currency.
Figure 2:
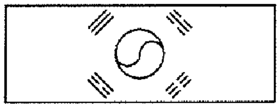
Figure 2:
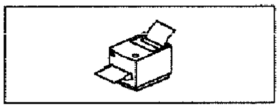
Figure 2:
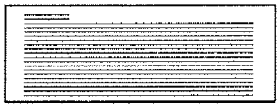
Figure 2:
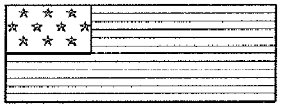
Figure 2:
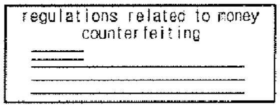

FIG. 2 is a view illustrating alternate image information that corresponds to currency identification information related to countries and amounts of currency. As illustrated in FIG. 2, the storage unit 140 stores a plurality of alternate image information that corresponds to the identification information. The alternate image information varies depending on the identification information.

For example, in a case of a Korean 1000 won bill, the alternate image information may have an image for "1000 won," which is the denomination of the bill. Further, in the case of the Korean 10000 won bill, the alternate image information may include an image for the Korean national flag. Furthermore, in the case of a U.S. 50 dollar bill, the alternate image information may include an image of the U.S. national flag. In addition, in the case of the U.S. 100 dollar bill, the alternate image information may include an image of text relating to regulations on currency counterfeiting.

Figure 3:
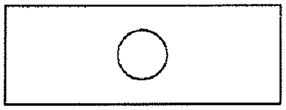
FIG. 3 is a view illustrating alternate image information that does not correspond to currency identification information related to countries and amounts of currency.
Figure 3:
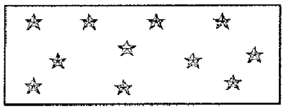
Figure 3:
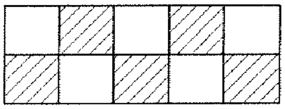

FIG. 3 is a view illustrating alternate image information that does not correspond to currency identification information related to countries and amounts of currency. As illustrated in FIG. 3, the storage unit 140 stores a plurality of alternate image information that do not correspond to the identification information. That is, no identification information corresponds to the alternate image information, and a plurality of alternate image information without corresponding identification information is stored in the storage unit 140.

Referring back to FIG. 1, when a printing object is currency, the controller 150 selects alternate image information corresponding to currency identification information input for identification of the currency and controls the selected alternate image information to be output. For example, when the currency identification information input for identification of the currency is currency identification information for the Korean 5000 won bill, the controller 130 detects identification information on Korea among identification information stored in the storage unit 140 and then searches identification information on 5000 won such that alternate image information corresponding to the currency identification information is selected.

That is, upon receiving at least one of information on the country, amount, and serial number of the currency, the controller 150 determines whether identification information having corresponding information on the country, the amount, and serial number of the currency is stored in the storage unit 140. If identification information identical (or corresponding) to the currency identification information is stored in the storage unit 140, the controller 150 selects alternate image information corresponding to the identification information and controls the selected alternate image information corresponding to the identification information to be output.

Further, in a case where the currency identification information input for identification of the currency is not identical to identification information stored in the storage unit 140, the controller 150 may select alternate image information that does not correspond to the identification information (such as the alternative image information illustrated in FIG. 3) and controls the selected alternate image information to be output. According to an aspect of the present invention, the storage unit 140 may then store the identification information corresponding to the selected alternate image information.

More specifically, in a case where the currency identification information is not identical to stored identification information (such as illustrated in FIG. 3), the controller 150 selects any one of a plurality of alternate image information that does not correspond to the identification information, controls the selected alternate image information to be output, and then stores the identification information corresponding to the selected alternate image information in the storage unit 140. Accordingly, in a case where identical currency identification information is input later, alternate image information can be easily output. However, it is understood that aspects of the present invention are not limited thereto, and the storage unit 140 may continue to store the alternate image information without corresponding identification information in other aspects.

The printing unit 160 prints out a recording paper after printing scanned data or selected alternate image information on the recording paper according to a control signal of the controller 150. The interface unit 170 is connected to the server 200 through a network and provides a communication interface in order to communicate with the server 200.

An operation according to aspects of the present invention will now be described with reference to FIG. 1. If a user puts a currency on the scan unit 120 of the image forming apparatus 100 and then presses, for example, a print button, the scan unit 120 scans an image of the currency. Then, the reader unit 130 determines whether the printing object is currency through, for example, pattern recognition. It is understood that, according to other aspects of the present invention, the determination can be made through other processes, such as detecting a chip on the currency.

In a case where the printing object is the currency, the controller 150 selects alternate image information corresponding to the input currency identification information and controls the selected alternate image information to be output. The image forming apparatus 100 according to aspects of the present invention may be connected to a network (such as the Internet) so that alternate image information stored in the storage unit 140 can be updated.

The alternate image information may be updated using the following method. First, an F/W downloading method may be used to store newly produced alternate image information again in the storage unit 140. Moreover, in a case where the image forming apparatus 100 is connected to the server 200 through one or more networks, the image forming apparatus 100 is periodically subjected to polling to the server 200. Then, in a case where new alternate image information is produced in the server 200, the image forming apparatus 100 receives the new alternate image information transmitted from the server 200 and updates the alternate image information.

Here, the polling is a transmission control method of continuously checking the states of other programs or devices from a program or device. More specifically, a communication method of the image forming apparatus 100 sends a message to the server 200 to identify whether alternate image information exists to be transmitted in multi-drop or multi-point communications in which several devices share the same line with one another. Then, in a case where the alternate image information exists, the communication method of the image forming apparatus 100 receives the alternate image information transmitted from the central server to update alternate image information of the image forming apparatus 100.

Moreover, the server 200 connected to the image forming apparatus 100 may periodically update the alternate image information stored in the storage unit 140.

Hereinafter, the operation and effect of the image forming apparatus 100 having the above structure and the control method thereof will be described with reference to FIG. 4.

Figure 4:
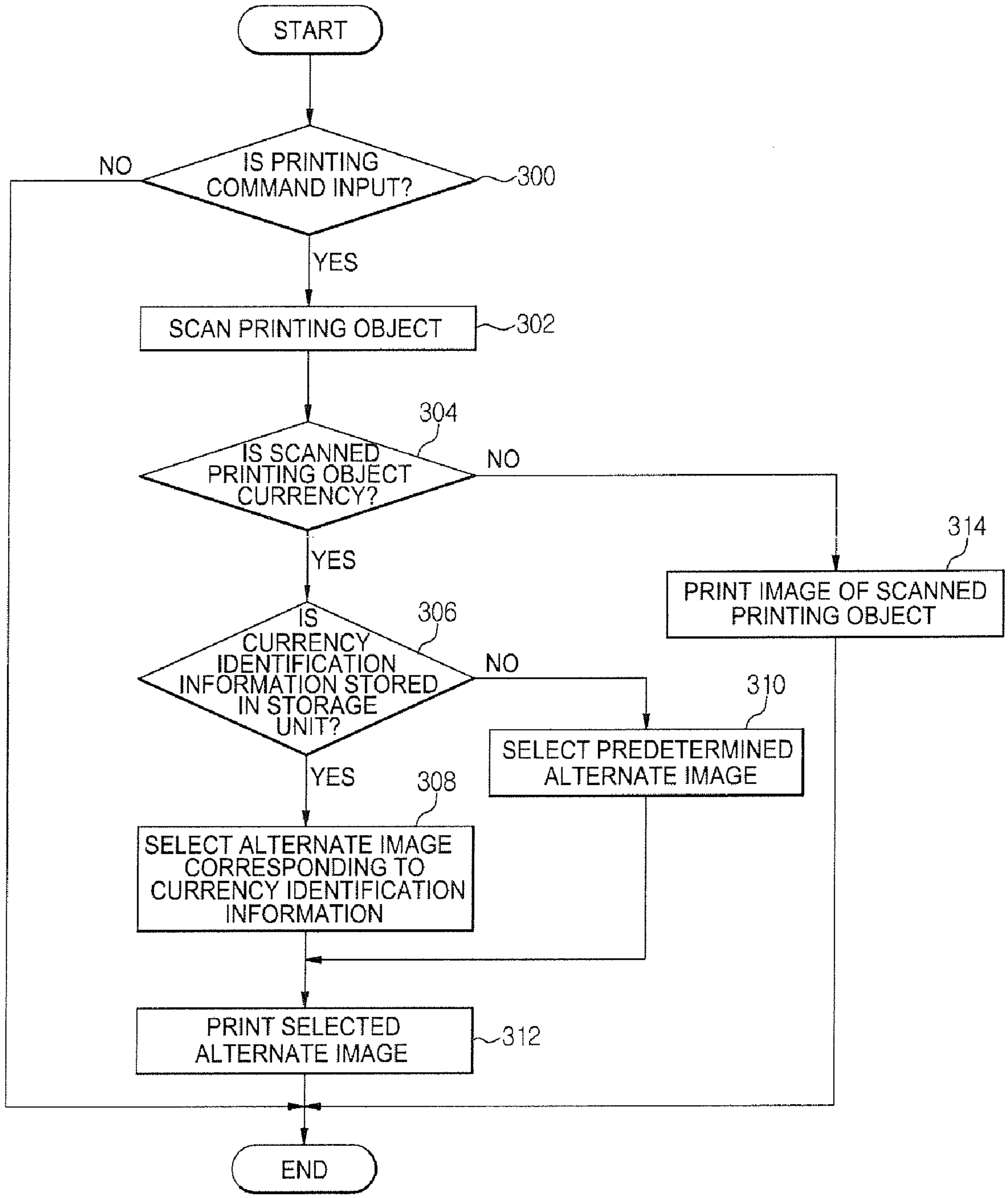
FIG. 4 is a flowchart illustrating a procedure for controlling an image forming apparatus according to an embodiment of the present invention.

FIG. 4 is a flowchart illustrating the control method for the image forming apparatus according to an embodiment of the present invention. Referring to FIG. 4, first, a user places a printing object (for example, currency) on the scan unit 120 of the image forming apparatus 100 and then presses, for example, a printing button provided in the control panel unit 110.

Then, the controller 150 determines whether the printing command is input in operation 300. If it is determined that the printing command is input (operation 300), the scan unit 120 scans the printing object in operation 302 and the reader unit 130 determines whether the printing object is currency (such as a bill, a check, paper currency, or a security) by reading the image pattern of the scanned printing object in operation 304.

If it is determined that the printing object is currency (operation 304), the controller 150 determines whether currency identification information read from the printing object is stored in the storage unit 140 in operation 306. If the currency identification information is stored in the storage unit 140, the controller 150 selects the corresponding alternate image information (for example, as illustrated in FIG. 2) from the storage unit 140 in operation 308. That is, the controller 150 selects the alternate image information corresponding to the currency identification information in operation 308.

If it is determined that the currency identification information is not stored in the storage unit 140 (operation 306), the controller 150 selects alternate image information with no corresponding currency identification information (for example, as illustrated in FIG. 3) from the storage unit 140 in operation 310. That is, the controller 150 selects predetermined alternate image information that does not correspond to the currency identification information in operation 310.

Thereafter, the controller 150 prints out the alternate image of the currency through the printing unit 160 according to the selected alternate image information in operation 312. Accordingly, when the printing object is currency, the image forming apparatus 100 prevents counterfeit currency from being printed, so that the social problem derived from the counterfeit currency can be prevented.

If it is determined that the printing object is not currency (operation 304), the image of the scanned printing object is printed out through the printing unit 160 in operation 314.

As described above, according to aspects of the present invention, an image of currency is output by being replaced with other images, so that the counterfeiting of currency can be prevented. Further, according to aspects of the present invention, various images are output depending on identification information of the currency, so that the aesthetic appearance of currency can be enhanced. Furthermore, according to aspects of the present invention, alternate image information can be updated if necessary, so that various desires of users can be satisfied.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of controlling an image forming apparatus, the method comprising:

determining whether a printing object to be printed by the image forming apparatus is currency;

upon determining the printing object is currency, selecting alternate image information that corresponds to the currency identification information of the printing object, if stored, or selecting predetermined alternate image information that does not correspond to the currency identification information of the printing object; and printing the selected alternate image information, wherein the predetermined alternate image information is selected from a plurality of alternate image information that are stored and do not correspond to the currency identification information, and wherein each alternate image information stored is different from another alternate image information stored.

2. The method as claimed in claim 1, wherein the determining of whether the printing object is the currency comprises receiving currency identification information that identifies the currency.

3. The method as claimed in claim 2, wherein the currency identification information includes at least one type of information from among a country, an amount of currency, and a serial number of the currency.

4. The method as claimed in claim 1, wherein the currency includes any one of a paper currency, a bill, a check, a gift certificate, and a security.

5. The method as claimed in claim 1, wherein the printing of the selected alternate image information comprises printing the selected alternate image information in place of a portion of the currency in the printing object.

6. A method of controlling an image forming apparatus, the method comprising:

determining whether a printing object to be printed by the image forming apparatus is currency;

selecting alternate image information if the printing object is the currency;

printing the selected alternate image information;

storing a first currency identification information and a first alternate image information corresponding to the first currency identification information; and storing a second currency identification information, different from the first currency identification information, and a second alternate image information corresponding to the second currency identification information, wherein the selecting of the alternate image information comprises selecting alternate image information corresponding to the currency identification information.

7. The method as claimed in claim 6, further comprising:

storing a third alternate image information that does not correspond to any currency identification information.

8. The method as claimed in claim 7, wherein the selecting of the alternate image information corresponding to the currency identification information comprises selecting the third alternate image information if the received currency identification information does not correspond to any stored currency identification information.

9. The method as claimed in claim 6, wherein the selecting of the alternate image information corresponding to the currency identification information comprises:

selecting the first alternate image information if the received currency identification information corresponds to the first currency identification information; and selecting the second alternate image information if the received currency identification information corresponds to the second currency identification information.

10. The method as claimed in claim 9, further comprising:

storing a third alternate image information that does not correspond to any currency identification information, wherein the selecting of the alternate image information corresponding to the currency identification information further comprises selecting the third alternate image information if the received currency identification information does not correspond to any stored currency identification information.

11. The method as claimed in claim 10, further comprising:

updating the stored third alternate image information to correspond to the received currency identification information if the third alternate image information is selected.

12. The method as claimed in claim 6, further comprising updating the stored alternate image information.

13. The method as claimed in claim 6, wherein the stored alternate image information and the stored currency identification information are stored in a central server.

14. An image forming apparatus comprising:

a reader unit to determine whether a printing object to be printed by the image forming apparatus is currency;

a controller upon determining the printing object is currency, to select alternate image information that corresponds to currency identification information, if stored, or to select predetermined alternate image information that does not correspond to the currency identification information; and a printing unit to print the selected alternate image information, wherein the predetermined alternate image information is selected from a plurality of alternate image information that are stored and do not correspond to the currency identification information, and wherein each alternate image information stored is different from another alternate image information stored.

15. The image forming apparatus as claimed in claim 14, wherein the reading unit determines that the printing object is the currency if the reading unit receives currency identification information from the print object.

16. The image forming apparatus as claimed in claim 14, wherein the printing unit prints the selected alternate image information in place of a portion of the currency in the printing object.

17. An image forming comprising:

a reader unit to determine whether a printing object to be printed by the image forming apparatus is currency;

a controller to select alternate image information if the printing object is the currency;

a printing unit to print the selected alternate image information; and a storage unit to store a first currency identification information, a first alternate image information corresponding to the first currency identification information, a second currency identification information different from the first currency identification information, and a second alternate image information corresponding to the second currency identification information, wherein the reading unit determines that the printing object is the currency if the reading unit receives currency identification information from the print object, and wherein the controller selects alternate image information corresponding to the received currency identification information.

18. The image forming apparatus as claimed in claim 17, wherein the storage unit stores a third alternate image information that does not correspond to any currency identification information.

19. The image forming apparatus as claimed in claim 18, wherein the controller selects the third alternate image information from the storage unit if the received currency identification information does not correspond to any currency identification information stored in the storage unit.

20. The image forming apparatus as claimed in claim 18, wherein the storage unit updates the stored alternate image information.

21. The image forming apparatus as claimed in claim 17, wherein:

the controller selects the first alternate image information from the storage unit if the received currency identification information corresponds to the first currency identification information; and the controller selects the second alternate image information from the storage unit if the received currency identification information corresponds to the second currency identification information.

22. The image forming apparatus as claimed in claim 21, wherein:

the storage unit stores a third alternate image information that does not correspond to any currency identification information; and the controller selects the third alternate image information from the storage unit if the received currency identification information does not correspond to any currency identification information stored in the storage unit.

23. The image forming apparatus as claimed in claim 22, wherein the storage unit updates the stored third alternate image information to correspond to the received currency identification information if the third alternate image information is selected.

24. A counterfeiting prevention system comprising:

a currency reader to determine whether a print object to be printed is currency;

a central server to store first alternate image information that corresponds to currency identification information and second alternate image information of a predetermined alternate image information that does not correspond to currency identification information; and an image forming apparatus to print one of the first and the second-alternate image information when the print object is the currency.

25. The counterfeiting prevention system as claimed in claim 24, wherein the currency reader determines that the printing object is the currency if the currency reader receives currency identification information from the print object.

26. The counterfeiting prevention system as claimed in claim 25, wherein the image forming apparatus prints alternate image information corresponding to the received currency identification information.

27. A counterfeiting prevention system comprising:

a currency reader to determine whether a print object to be printed is currency;

a central server to store alternate image information; and an image forming apparatus to print the alternate image information when the print object is the currency, wherein the currency reader determines that the printing object is the currency if the currency reader receives currency identification information from the print object, wherein the image forming apparatus prints alternate image information corresponding to the received currency identification information, and wherein the central server stores a first currency identification information, a first alternate image information corresponding to the first currency identification information, a second currency identification information different from the first currency identification information, and a second alternate image information corresponding to the second currency identification information.

28. The counterfeiting prevention system as claimed in claim 27, wherein the central server stores a third alternate image information that does not correspond to any currency identification information.

29. The counterfeiting prevention system as claimed in claim 28, wherein the image forming apparatus prints the third alternate image information if the received currency identification information does not correspond to any currency identification information stored in the central server.

30. The counterfeiting prevention system as claimed in claim 28, wherein the central server updates the stored alternate image information.

31. The counterfeiting prevention system as claimed in claim 27, wherein:

the image forming apparatus prints the first alternate image information if the received currency identification information corresponds to the first currency identification information; and the image forming apparatus prints the second alternate image information if the received currency identification information corresponds to the second currency identification information.

32. The counterfeiting prevention system as claimed in claim 31, wherein:

the central server stores a third alternate image information that does not correspond to any currency identification information; and the image forming apparatus prints the third alternate image information if the received currency identification information does not correspond to any currency identification information stored in the central server.

33. The counterfeiting prevention system as claimed in claim 32, wherein the central server updates the stored third alternate image information to correspond to the received currency identification information if the image forming apparatus prints the third alternate image information.

* * * * *

UNITED STATES PATENT AND TRADEMARK OFFICE

CERTIFICATE OF CORRECTION

PATENT NO. : 8,194,278 B2
APPLICATION NO. : 11/956545
DATED : June 5, 2012
INVENTOR(S) : Mi Kyoung Han It is certified that error appears in the above-identified patent and that said Letters Patent is hereby corrected as shown below:

Column 9, Line 37 (Approx.), In Claim 24, delete "second-alternate" and insert -- second alternate --, therefor.

Signed and Sealed this
Seventh Day of August, 2012

David J. Kappos

David J. Kappos
*Director of the United States Patent and Trademark Office*